United States Patent [19]
Waldron

[11] B  3,982,351
[45] Sept. 28, 1976

[54] CAB MOUNTED REMOTE CONTROL APPARATUS

[75] Inventor: David W. Waldron, Valdosta, Ga.

[73] Assignee: Lowndes Engineering Co., Inc., Valdosta, Ga.

[22] Filed: Feb. 15, 1974

[21] Appl. No.: 442,866

[44] Published under the second Trial Voluntary Protest Program on February 24, 1976 as document No. B 442,866.

Related U.S. Application Data

[63] Continuation of Ser. No. 216,395, Jan. 10, 1972, abandoned, which is a continuation-in-part of Ser. No. 20,364, March 17, 1970, Pat. No. 3,633,825.

[52] U.S. Cl. .............................. 43/129; 252/359 R; 252/359 CG
[51] Int. Cl.² ........................................ A01M 19/00
[58] Field of Search ................. 43/129, 132 A, 125; 239/135, 373, 405–406, 423–424; 252/359 A, 259 CG

[56] References Cited
UNITED STATES PATENTS

| | | |
|---|---|---|
| 2,889,284 | 6/1959 | Haynes et al. ................ 252/359 CG |
| 3,242,098 | 3/1966 | Andrews ......................... 252/359 |
| 3,244,641 | 4/1966 | Durr et al. ....................... 252/359 |

*Primary Examiner*—G. E. McNeill
*Attorney, Agent, or Firm*—Newton, Hopkins & Ormsby

[57] ABSTRACT

Apparatus for use in controlling a fog generator used in applying insecticide. The control apparatus includes a control panel which is adapted to be supported at a remote location relative to the fog generator and is provided with a vertically adjustable support post having a universally adjustable mounting base for securing the control panel at a desired adjusted position. A flow meter having an adjustable flow rate valve operatively associated therewith is mounted on the control panel and connected in line between insecticide supply means and discharge means. A thermometer is connected in line between the insecticide supply means and the discharge head for monitoring the temperature of the insecticide being discharged, for use in determining the regulation of the flow control valve means. An electromagnetic control valve is connected between the insecticide supply means and the discharge head and is operable between an on and off insecticide discharge position by switch means provided on the control panel.

10 Claims, 3 Drawing Figures

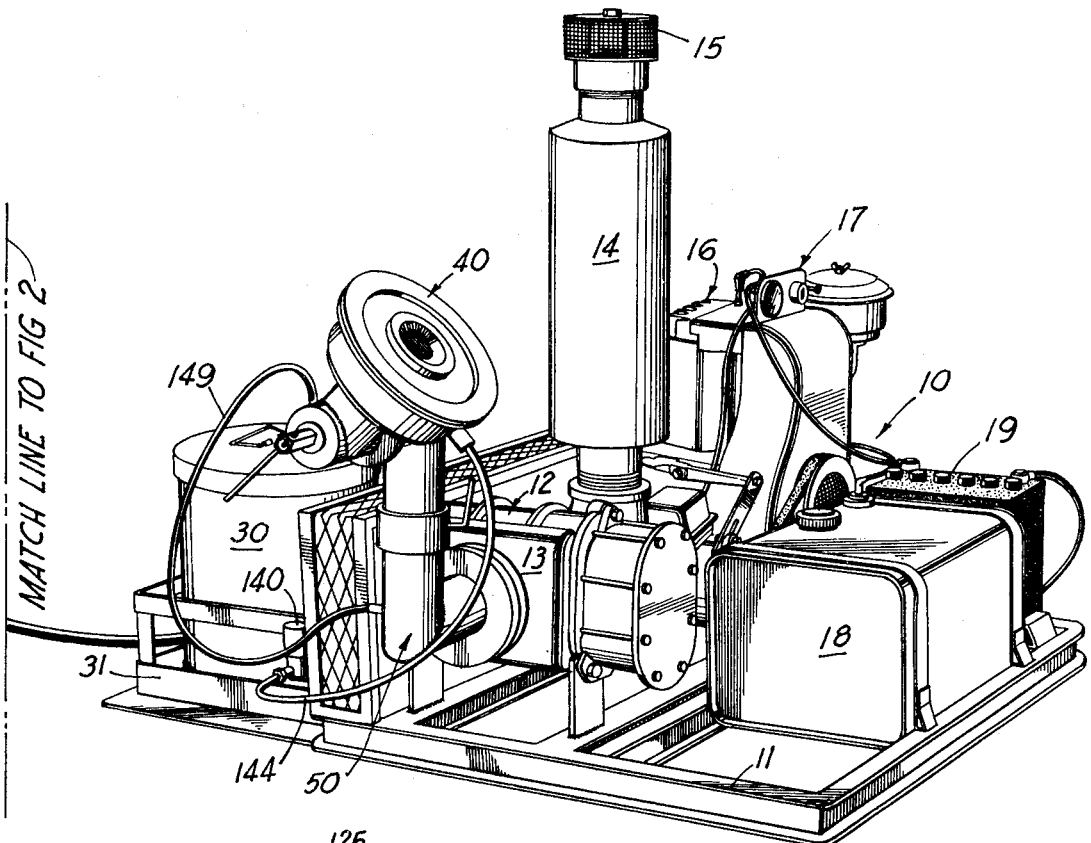
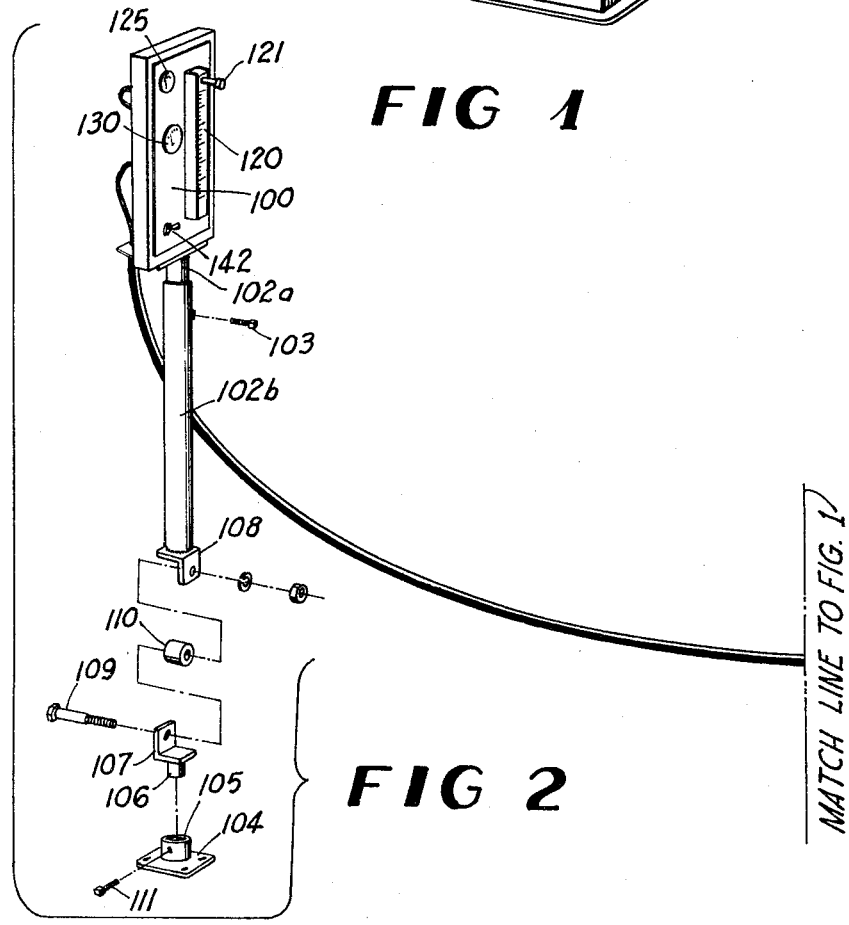
FIG 1
FIG 2

CAB MOUNTED REMOTE CONTROL APPARATUS

CROSS REFERENCE TO RELATED APPLICATION

This application is a continuation of Ser. No. 216,395, filed Jan. 10, 1970, now abandoned, which is a continuation in-part of my earlier patent application Ser. No. 20,364 now U.S. Pat. No. 3,633,825 filed Mar. 17, 1970 for FOGGING METHOD AND APPARATUS.

BACKGROUND OF THE INVENTION

This invention relates to apparatus for use in controlling an insecticide applying fog generator and is more particularly concerned with control apparatus which can be located remotely from the fog generator.

In the past, insecticides, pesticides, fungicides and other chemicals being spread over a large outdoor area have been dispersed in a liquid carrier, such as diesel oil, and entrained in a stream of hot air. This liquid mixture, which has only about 5 to 6% active ingredients, is usually transported for application in a large tank holding 350 to 400 gallons operated in conjunction with a fogging machine.

These prior art fogging machines usually consist of a burner which generates a blast of air, a nozzle arrangement for mixing the liquid from the tank and directing this aerosol outwardly. Since the liquid mixture of diesel oil and active ingredients formed relatively large droplets in the thus produced fog which caused rapid settling of the droplets, high operating pressures and high discharge velocities were required if the fog was to carry for any appreciable distance. Moreover, the relatively large droplets cause spotting of protective coatings on various objects and burning of foliage on plants.

Due to the bulk of the liquid mixture and the large quantities of fuel needed to super heat the air, large and expensive special equipment was needed to carry the fogging machine. Except for serving as a carrier to disperse the active ingredient, there appears to be little, if any, need for the diesel oil so that it is essentially wasted and only contributes to pollution as well as spotting of protective coatings and burning of foliage.

Also recent test results have shown that the droplet size in a fog containing an active ingredient liquid changes effective killing power of the active ingredient on insects. It has been found that the optimum droplet size is 5 to 20 microns mass medium diameter, much smaller than that achieved with prior art fogging machines.

Applicant's above-mentioned co-pending application is directed to a relatively small compact fogging apparatus which will dispense, in finely divided form, ultra-small quantities of the concentrated active ingredient liquids without the necessity of dissolving this ingredient in a liquid carrier. Thus, no large tank is necessary in the apparatus, and the expense, undesirable bulkiness and pollution effect of the diesel oil are eliminated, while at the same time, the power necessary to dispense a prescribed quantity of active ingredient is greatly reduced. Furthermore, the effectiveness and evenness of distribution of insecticides, pesticides, fungicides and like chemicals are improved by using the fog generating apparatus disclosed in my above mentioned co-pending application.

One problem with my above-mentioned fog generator resulted in the location of the control apparatus for effecting operation of the fog generating mechanism. The control apparatus was located on the fog generator apparatus which was positioned in the rear of a truck, causing an operator to get in and out of a truck when it was necessary to either stop or start the fog generator or to effect adjustment of flow control means.

SUMMARY OF THE INVENTION

The above disadvantages of the prior art have been overcome by the present invention which basically includes a control panel operatively associated with insecticide supply means and insecticide discharge means with the control panel including a flow meter having an adjustable flow rate valve and further including an electromagnetically operated on and off valve which will permit insecticide to be transferred from the insecticide supply means to the discharge means.

An important feature of the present invention is the provision of means for supporting the control panel at a remote location such as the cab of a carrier vehicle, wherein the support means includes an adjustable post for supporting the control panel at a selected vertically adjusted elevation. The adjustable mounting post includes a universally adjustable base support mechanism wherein the control panel can be angularly adjusted through approximately 360° about a substantially vertically disposed axis and approximately 180° about a substantially horizontally disposed axis.

Another important feature of the present invention is the provision of a thermometer located on the control panel and in line with the insecticide being delivered from the supply means to the discharge means for monitoring the temperature of the insecticide to thereby determine the regulation of the flow rate control valve.

A further important feature of the present invention is the provision of an electromagnetic control valve located in line between the insecticide supply means and the discharge means for controlling the insecticide between an off and on position.

It is therefore a primary object of the present invention to provide a control apparatus for a fog generator which can be remotely located relative to the generator and includes selectively adjustable control means for controlling the flow rate in an insecticide applying operation.

A further object of the present invention is to provide a mounting structure for supporting a fog generator control panel in a selected adjusted position within the cab of a carrier vehicle.

An additional object of the present invention is to provide a remote control apparatus for a fog generator which is simple in construction and operation, economical to manufacture and reliable in performance.

These and other objects and advantages of the details of construction will become apparent upon reading the following description of the illustrative embodiment, with reference to the attached drawings wherein like reference numerals have been used to refer to like parts throughout the several figures, and wherein:

BRIEF DESCRIPTION OF THE DRAWINGS

FIG. 1 is a perspective view showing a fog generator utilizing the principles of the present invention;

FIG. 2 is an elevational plan view of a remote control panel; and,

DESCRIPTION OF THE ILLUSTRATIVE EMBODIMENT

Figure 3:
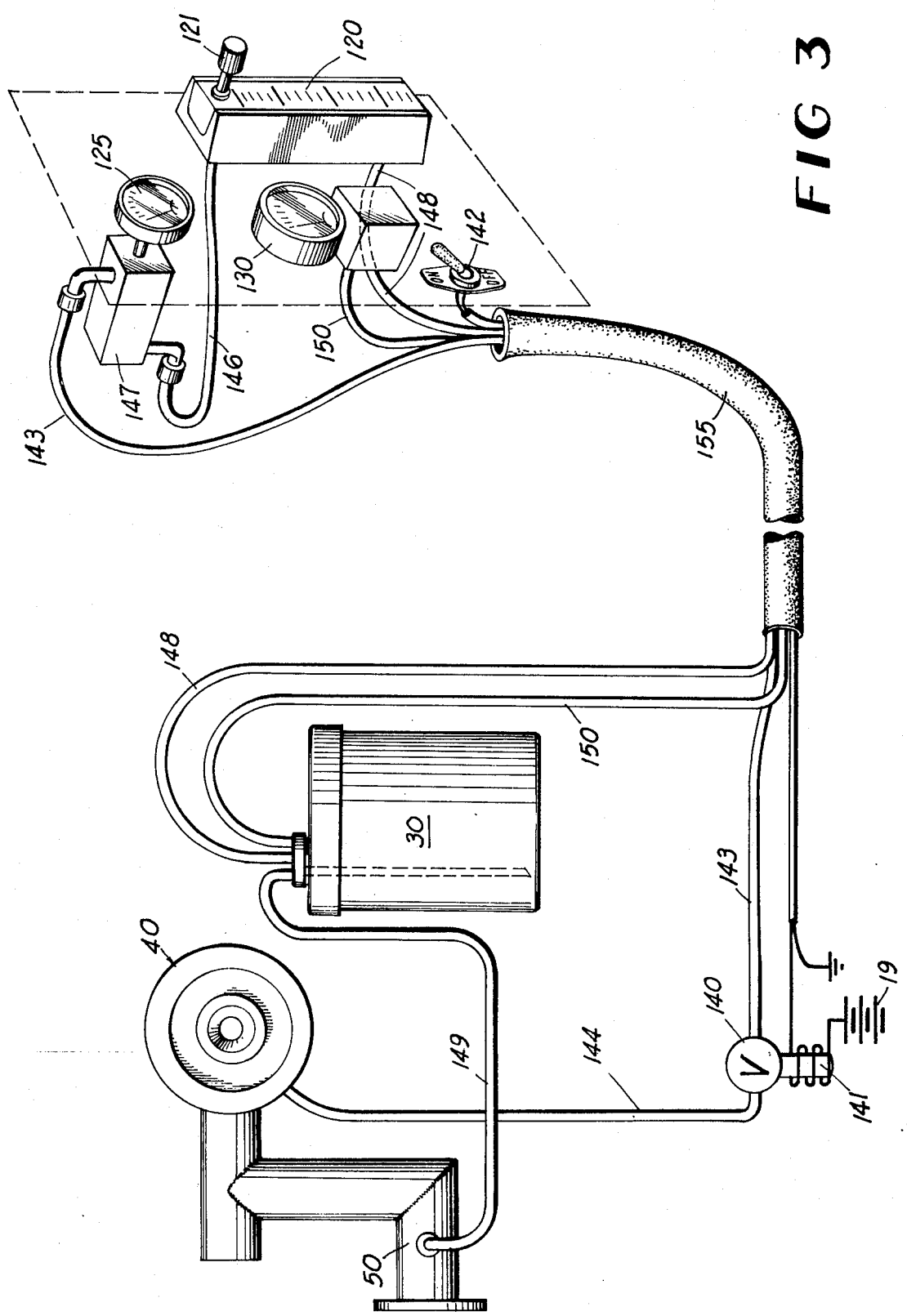
FIG. 3 is a schematic view showing the electrical and insecticide flow diagram between the fog generator and the remote control panel.

Referring now to the drawing, the fog generator embodying the principles of the present invention is shown and generally represented by the reference numeral 10. The fog generator includes a substantially rectangular base frame 11 constructed of conventional metal stock material operable for supporting air pressure developing means 12 having an air plenum chamber 13. The air plenum chamber 13 includes an intake silencer 14 having a filtered inlet opening 15. The air pressure developing means 12 is driven by a conventional gas powered motor means 16 having a conventional start, stop and regulation control means 17. Fuel for motor 16 is contained within a supply tank 18. A battery 19 is provided for furnishing power to a conventional electric starter (not shown) on the motor 16 and for furnishing power to the electrical control means on the fog generator. The air pressure developing means includes a conventional rotary fan means driven by motor 16 and is provided with a protective grill means 20.

As shown in FIG. 1, insecticide to be used in a fog generating operation is contained within a cylindrical upright supply tank 30 supported on a rectangular base frame 31. The insecticide contained within the supply means 30 is delivered at a controlled rate to a fog generator discharge head 40. Reference is made to applicant's above-mentioned co-pending application for details of construction of the discharge head 40. The discharge head 40 is supported on the air plenum chamber 13 for 360° angular adjustment about a substantially vertically disposed axis and 360° adjustment about a substantially horizontally disposed axis.

As shown in FIGS. 2 and 3, the fog generator is controlled in an insecticide applying operation by means of control apparatus which are generally represented by the reference numeral 100. As shown in FIGS. 2 and 3, the control apparatus includes a control panel 100 which is adapted to be supported in an elevated position and at a remote location such as in the cab of a carrier vehicle. The control panel 100 is supported at a selected elevated position by means of a pair of telescoping post members 102a, 102b. Conventional set screw means 103 is provided for securing the telescoping sections in a selected vertically adjusted position. Post 102b is connected adjacent its lower end to a universally adjustable mounting structure. The universally adjustable mounting structure includes a base element 104 which is adapted to be secured to base frame means by conventional threaded bolt connecting means (not shown). The base element 104 includes an upstanding collar portion 105 having an opening formed for receiving a complementary downwardly extending stud shaft 106 formed on an L-shaped mounting bracket 107. The L-shaped mounting bracket 107 is adapted to be connected to a similar L-shaped mounting bracket 108 formed on the lower end of post 102b. The L-shaped brackets 107, 108 are secured to each other for pivotal adjustment about a horizontal axis by means of a connecting bolt 109. In an assembled relationship, a spacer element 110 is provided between the L-shaped bracket members 107, 108. The pivotal connection of bolt 109 will permit adjustment of the control apparatus about a horizontally disposed axis. The rotatable connection between stud shaft 107 and collar 105 will permit angular adjustment of the control apparatus about a vertically disposed axis, with the angular adjustment being secured in a selected adjusted position by means of conventional set screw locking means 111.

As shown in FIG. 2, the control apparatus includes a flow meter 120 having a selectively adjustable flow rate valve mechanism 121. The flow meter 120 is constructed of transparent material which will permit visual monitoring of the insecticide during a metering operation. Control panel 100 is provided with a thermometer 125 which is connected in line with the insecticide flow for monitoring the temperature of the insecticide as it is being discharged. The temperature of the insecticide being applied is utilized in calculation of the adjustment of the flow meter valve 121.

As shown in FIGS. 2 and 3, the control panel 100 includes a pressure gage 130 which is operatively connected to the insecticide supply tank 30 for indicating the pressure maintained on the insecticide.

As shown in FIGS. 2 and 3, the insecticide is controlled in an on and off position in a discharge operation by means of an electromagnetically operated valve 140. Valve 140 is operated by a conventional solenoid 141 which is energized by electrical power supplied from battery 19. The electrical power for operating solenoid valve 140 is controlled by an on and off switch means 142 located on the control panel 100. The solenoid valve 140 includes an insecticide input line 143 and an insecticide discharge line 144. With the solenoid 140 in an on position, insecticide will be transferred along line 144 to the discharge head 40. Supply line 148 is connected in flow communication between supply tank 30 and the lower end of the flow meter 120. The upper end of the flow meter 120 having the flow rate control valve 121 is connected in flow communication with a branch line 146. Line 146 is connected to a mounting block 147 which receives the thermometer 125. Discharge of insecticide from block 147 to solenoid valve 140 is through line 143.

Insecticide contained in supply tank 30 is transferred through line 148 by pressure means being applied to the upper surface of the insecticide. The pressure means is supplied to the upper surface of insecticide by a pressure line 149 which is connected between the supply tank 30 and the universal mounting conduit means 50 connected to the air plenum chamber 13. The insecticide control apparatus also includes a pressure line 150 connecting tank 30 to pressure gauge 130 so that the pressure within the supply tank can be monitored in a fog generating operation. The insecticide supply lines 143, 148 and pressure line 150 and the electrical control lines to switch 142 are transferred between the fog generator located on the rear of a carrier vehicle, and the control panel 100, located in the cab portion of the carrier vehicle, by means of a trunk line 155. The trunk line 155 is provided with a casing for surrounding all the insecticide supply lines and the electrical control line.

OPERATION

With the fog generator supported in the rear of a carrier vehicle having a supply of fuel and insecticide, a fog generating operation is initiated by starting the motor drive means 16. After the motor drive means 16 has been started, air pressure will be developed in the air plenum chamber 13 and transferred through the universal mounting conduit 50 outwardly through the discharge head 40. The air pressure developed within the universal mounting conduit 50 will also be transferred along line 149 for developing pressure in the insecticide supply tank 30. The insecticide contained in supply tank 30 will then be conducted through supply line 148 to the lower end of flow meter 120. Insecticide transferred through flow meter 120 will then flow along branch supply line 146 into the thermometer mounting block 147. The insecticide leaving block 147 is transferred along supply line 143 to the electromagnetic valve 140. When the electromagnetic valve 140 is moved to an on position by switch 142, the insecticide is transferred along conduit 144 to the discharge head 40 to be entrained within the air pressure forced outwardly through the discharge head 40. Reference is made to Applicant's above-mentioned co-pending application for a Fog Generating Apparatus for details of construction and operation of the discharge head 40.

During a fog generating operation, the pressure maintained on the supply tank 30 can be monitored within the cab of the carrier vehicle by the pressure gauge means 30. The rate of flow of insecticide through the flow meter 120 can be regulated by adjusting control valve 121. A fog generating operation is initiated within the cab of the carrier vehicle by movement of the switch means 142 to an on position for energizing electromagnetic on and off valve 140.

It now becomes apparent that the above described illustrative embodiment of a fog generator control apparatus is capable of obtaining the above stated objects and advantages. It is obvious that those skilled in the art may make modifications in the details of construction without departing from the spirit of the invention which is to be limited only by the scope of the appended claims.

What is claimed is:

1. Apparatus for use in controlling a fog generator used in applying insecticides from a vehicle comprising in combination:
   a. discharge head for use in developing a fog mixture of air and insecticide;
   b. means for supplying insecticide under pressure to said discharge head including a supply tank;
   c. means for supplying air pressure means to said discharge head; and,
   d. control means operatively associated with said insecticide supply means for controlling the discharge of said insecticide under pressure, said control means including a flow meter having an adjustable flow rate control valve and thermometer means for sensing the temperature of insecticide flowing through said flow rate control valve and said flow meter, said flow meter and said thermometer means and said flow rate control valve being located in the vehicle operator's position and remote from said supply tank and from said discharge head, supply lines for said liquid including a first supply line in flow communication between said supply tank and said control means and a second supply line in flow communication between said control means and said discharge head, and transfer means for transferring liquid through said supply lines from said supply tank through said first supply line, through said flow meter, through said second supply line to said discharge head, said flow meter and said adjustable flow rate control valve being connected in series between said supply tank and said discharge head whereby flow of insecticide to said discharge head may be monitored and controlled in said vehicle operator's position in accord with temperature variations occuring in said insecticide, an electromagnetic valve in one of said supply lines operable between an insecticide off position and an insecticide discharge position, and switch means in said vehicle operator's position for controlling said electromagnetic valve whereby a vehicle operator may not only control the associated vehicle but may also completely control discharge of said insecticide, said flow meter and said thermometer being disposed adjacent to each other for simultaneous observation by the operator, said valve being disposed for manipulation thereof by the operator as he observes said flow meter.

2. Apparatus as defined in claim 1 further characterized in that said means for supplying air pressure includes air blower means and wherein said air blower means includes means operatively associated with said insecticide supply means for developing air pressure thereon to cause said insecticide to be discharged through said flow meter, said rate control valve and said electromagnetic valve to said discharge head.

3. Apparatus as defined in claim 1 further characterized in that said control means is supported on a remotely located control panel having a vertically adjustable support post connected to a universal adjustable support base.

4. The apparatus defined in claim 1 including a control panel carrying said thermometer means and said flow meter and said control valve in juxtaposition with each other so that the indicated temperature of said insecticide and the flow rate can be simultaneously observed visually by the operator and the flow rate may be altered by said operator.

5. Apparatus as defined in claim 4 further characterized in that said switch means includes a remotely located switch on said panel for effecting operation of said electromagnetic valve.

6. Apparatus as defined in claim 4 further characterized in that said control means includes a pressure gage on said panel operatively associated with said insecticide supply means for monitoring the pressure maintained on said supply means.

7. The apparatus defined in claim 4 including post member for supporting said control panel at one end of said post member in an elevated position and a mounting structure for mounting the other end of said post member.

8. The apparatus defined in claim 7 wherein said post member is a telescoping post by means of which the effective height of the panel can be varied.

9. The apparatus defined in claim 8 wherein said mounting structure includes a universal member permitting rotation of said post member and pivoting of said post member about said mounting structure.

10. Apparatus as defined in claim 9 further characterized in that said post includes telescoping sections which are adjustable relative to each other and includes locking means for securing said sections in a selected adjusted position.

* * * * *